United States Patent
Damera-Venkata et al.

(10) Patent No.: US 6,781,719 B2
(45) Date of Patent: Aug. 24, 2004

(54) HALFTONE IMAGING WITH REDUCED DOT ISOLATION

(75) Inventors: Niranian Damera-Venkata, Sunnyvale, CA (US); Utuk A. Agar, Mountain View, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 265 days.

(21) Appl. No.: 10/184,134

(22) Filed: Jun. 27, 2002

(65) Prior Publication Data

US 2004/0001232 A1 Jan. 1, 2004

(51) Int. Cl.[7] .......................... H04N 1/405; H04N 1/409
(52) U.S. Cl. ..................... 358/3.05; 358/3.06; 358/3.26
(58) Field of Search ............................... 358/3.03, 3.05, 358/3.06, 3.26, 1.9; 382/252, 275

(56) References Cited

U.S. PATENT DOCUMENTS

| | | | |
|---|---|---|---|
| 3,922,484 A | | 11/1975 | Keller |
| 4,890,167 A | | 12/1989 | Nakazato et al. |
| 5,406,379 A | * | 4/1995 | Kingsley et al. ............. 358/3.1 |
| 6,190,058 B1 | * | 2/2001 | Koide et al. .................. 358/1.9 |
| 6,351,319 B1 | | 2/2002 | Schweid et al. |
| 6,459,817 B1 | * | 10/2002 | Matsushiro .................. 382/270 |

FOREIGN PATENT DOCUMENTS

EP 0802667 10/1997

OTHER PUBLICATIONS

Marcu, G., "Error diffusion algorithm with output position constraints for homogeneous highlight and shadow dot distribution", Journal of Electronic Imaging (Jan. 2000) vol. 9, No. 1, pp. 46–51.*

Meng Yao & Parker, K.J., "Dot gain compensation in the blue noise mask", Proceedings of the SPIE—The International Society for Optical Engineering (1995) vol. 2411, pp. 221–7.*

* cited by examiner

*Primary Examiner*—Scott Rogers

(57) ABSTRACT

An output halftone image is formed from an input image having a plurality of input image pixels. The output image is formed by processing the input image pixels with a halftoning process that incorporates a hard dot stability constraint. The halftoning process forces a determination to produce a dot for each of N output halftone image pixels following an output halftone image pixel dot that would otherwise be isolated, where $N \geq 1$.

27 Claims, 2 Drawing Sheets

HALFTONE IMAGING WITH REDUCED DOT ISOLATION

BACKGROUND

Halftone imaging, sometimes referred to as "halftoning," is a well-known technique for transforming a continuous tone original image (e.g., a photograph) into a halftone image having pixels that are either black (presence of a mark or "dot") or white (absence of a mark or "dot"). Although the absence of a black dot can be considered a white dot, for ease of discussion, the term "dot", as used herein, refers to the presence of a black dot.

In general, many halftoning algorithms modulate the density or clustering of the dots of the halftone image based upon the gray scale value for each pixel of the original image. Typically, halftone image processing entails a decision to print or not print a dot for each pixel of the halftone image. Whether a dot is printed or not, the halftone value of each pixel of the halftone image will have some level of quantization error, except in the instances where the corresponding pixel of the original image is black or white.

Error diffusion techniques have been developed in order to spread or diffuse the quantization errors that result from halftone imaging over neighboring pixels of the halftone image, to thereby make the quantization error or noise inherent in the halftone image as imperceptible as possible to the human eye. In essence, error diffusion is a type of noise filtering which shapes the quantization error or noise inherent in the quantization (digitization) of the original continuous tone image, e.g., by shifting the quantization noise from a low frequency domain that is perceptible to the human eye to a high frequency domain that is less perceptible (or imperceptible) to the human eye.

Some imaging devices cannot stably or reliably produce dots beyond a certain horizontal dot resolution. For example, some laser printers operate in an enhanced resolution imaging mode, sometimes referred to as a High Definition Imaging (HDI) mode, in which the laser horizontal scan line of the normal resolution mode is subdivided into finer increments, whereby the laser printer produces dots during correspondingly shorter laser on/off cycles. In other words, the pixel of the halftone image produced by the laser printer in the enhanced resolution mode is subdivided into sub-pixels. If the normal horizontal resolution mode of a laser printer is 600 dots per inch (dpi), and the enhanced horizontal resolution mode of that laser printer is 2,400 dpi, then each pixel of the halftone image produced by that laser printer in the enhanced horizontal resolution mode is subdivided into 4 sub-pixels, so that the laser on/off cycle in the enhanced horizontal resolution mode is ¼th the laser on/off cycle in the normal horizontal resolution mode. However, the laser printer might not be capable of stably or reliably printing isolated "sub-pixel dots" at that sub-pixel resolution. Such instability of the laser printer or other image forming device is referred to herein as "dot instability".

Dot instability results in perceptible visual anomalies or quantization noise in the resultant half-tone image produced by the laser printer due to the absence of dots at pixel or sub-pixel locations where dots are supposed to be present. For example, some laser printers, when operating in an enhanced horizontal dot resolution mode, experience severe single sub-pixel dot instability, but are able to print two or more adjacent sub-pixel dots in a reliable and stable manner. Other laser printers might only be capable of printing a minimum of three or more adjacent sub-pixel dots in a reliable and stable manner. In general, a pixel or sub-pixel dot is considered to be "isolated" if it is not adjacent to at least M−1 previous pixel or sub-pixel dots in the laser scan direction, where M is the minimum number of pixel or sub-pixel dots that the laser printer can reliably and stably produce.

Some known error diffusion halftoning algorithms incorporate soft dot stability constraints to force a certain level of dot clustering in an attempt to minimize perceptible quantization noise in the halftone image attributable to dot instability of the image forming device. For example, some soft dot stability constraints ensure that a minimum average number of dots are produced, or impose some other global parametric constraint regarding dot clustering. However, such error diffusion halftoning algorithms do not eliminate isolated dots in the halftone image, without excessive dot clustering.

SUMMARY

According to one aspect of the present invention, an output halftone image is formed from an input image having a plurality of input image pixels. The output image is formed by processing the input image pixels with a halftoning process that incorporates a hard dot stability constraint. The halftoning process forces a determination to produce a dot for each of M output halftone image pixels following an output halftone image pixel dot that would otherwise be isolated, where $M \geq 1$.

Other aspects and advantages of the present invention will become apparent from the following detailed description, taken in conjunction with the accompanying drawings, illustrating by way of example the principles of the present invention.

DETAILED DESCRIPTION

Figure 1:
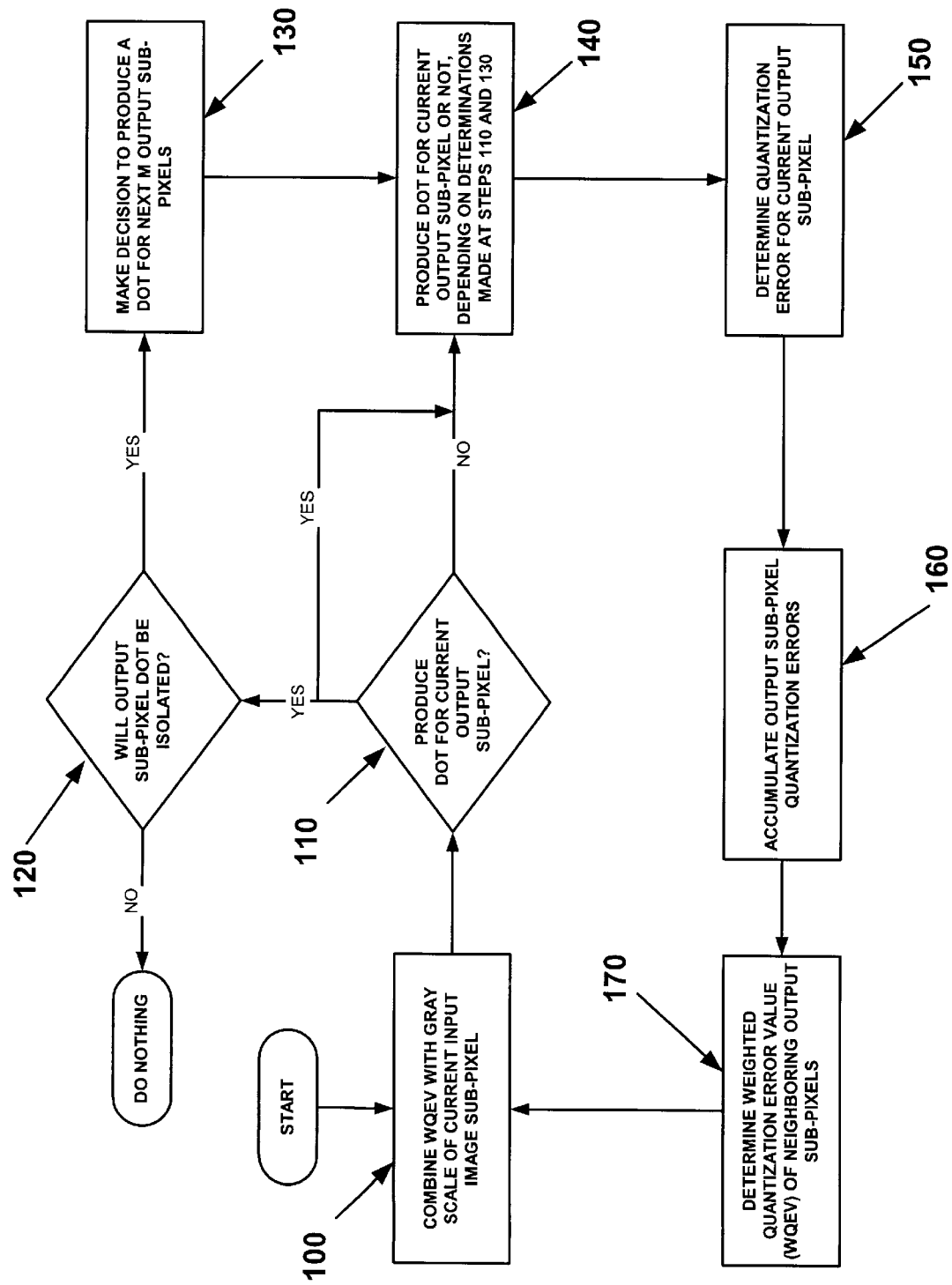
FIG. 1 is a functional block diagram of an exemplary laser printing system.

The present invention is embodied in a method for using a halftoning technique to transform a color or gray scale image into an output image. The halftoning technique incorporates a hard dot stability constraint and eliminates or reduces isolated pixels or sub-pixels in the output image.

In the following description of an exemplary embodiment of the method, the input image is a gray scale image, and the output image is generated by a laser printer operating in the enhanced resolution mode. Each pixel of the output halftone image is subdivided into plural (e.g., four) sub-pixels. However the method can also be used in the standard resolution mode of the laser printer, or in any imaging mode of any image forming device or system. Additionally, the method can also be used to transform a color image by repeating the steps for each colorant pixel or sub-pixel of the input image, where the term "colorant pixel" or "colorant sub-pixel" as used herein refers to each color component (e.g., cyan (C), magenta (M), yellow (Y), black (B)) of each pixel or sub-pixel that is processed, incorporating any additional constraints that apply to color image processing, e.g., a constraint prohibiting the printing of both cyan and magenta in the same pixel or sub-pixel location of the output image. An exemplary color smoothed error diffusion technique that can be used in the practice of the method is described in co-pending U.S. patent application Ser. No. 09/940,991, entitled "Color Smooth Error Diffusion", which is assigned to the assignee of the present invention, and which is incorporated herein by reference.

In general, in accordance with the method, pixels or sub-pixels of the input image are processed according to the laser scan pattern (e.g., raster, serpentine), and are quantized using an error diffusion halftoning algorithm. However, the present invention is not limited to an error diffusion halftoning algorithm. Rather, the method can be used in conjunction with any desired halftoning algorithm that has a hard dot stability constraint. In this connection, the particular quantization scheme described below is presented for purposes of illustration only, and is not limiting to the present invention.

An exemplary error diffusion technique modifies the gray scale value of the current input image sub-pixel being processed by adding an accumulated quantization error from neighboring output sub-pixels. Produced is an error-modified gray scale value of the current input sub-pixel.

For example, assume that the gray scale value of the current sub-pixel being processed is 175 on a scale of 0 (white) to 255 (black), that the quantization error of the output halftone image sub-pixel to the left of the current sub-pixel being processed is +23, and that the quantization error of the output halftone image sub-pixel above the current sub-pixel being processed is +62. A weighted error filter can be used to produce a weighted quantization error value for these two neighboring output halftone image sub-pixels. The quantization error values of these two neighboring output halftone image sub-pixels can then each be multiplied by a weighting coefficient of 0.50, with the resultant weighted error values being added together to yield the resultant weighted quantization error value of those two neighboring output halftone image sub-pixels. If the weighted quantization error value of the neighboring output halftone image sub-pixels exceeds a prescribed maximum value, it can be clipped at the prescribed maximum value. In the illustrative example, the weighted quantization error value of the two neighboring output halftone image sub-pixels is (0.5×62)+(0.5×23)=42.5.

With reference now to FIG. 1, a method according to an embodiment of the present invention will now be described. At step 100, the weighted quantization error value (wqev) of the neighboring output halftone image sub-pixels is combined with (e.g., subtracted from) the gray scale value of the current input image sub-pixel being processed to produce an error-modified gray scale value of the current input image sub-pixel. In the example given above, the error-modified gray scale value of the current input image sub-pixel is 175−42.5=132.5.

Next, at step 110, a halftoning technique is employed to determine whether an output halftone image sub-pixel dot should be produced or not. An exemplary halftoning technique is gray scale thresholding, wherein an output halftone image sub-pixel dot is produced if the error-modified gray scale value of the current input image sub-pixel exceeds a prescribed gray scale threshold value; otherwise, that sub-pixel location in the output halftone image is not marked, i.e., no dot is produced at that sub-pixel location in the output halftone image. For example, assume that the prescribed gray scale threshold value is set at 128, which is an intermediate gray scale value midway between white (0) and black (255). In the illustrative example, since the modified gray scale value of the current input image sub-pixel (132.5) is greater than 128, a decision is made at step 110 to produce an output halftone image sub-pixel dot.

Next, at step 120, if a decision was made at step 110 to produce an output halftone image sub-pixel dot, it is determined whether doing so would result in that current output halftone image sub-pixel dot being isolated. For example, this determination can be made by examining the past or previous M−1 output halftone image sub-pixel(s) adjacent to the current output halftone image sub-pixel dot in the laser scan direction to determine whether a dot was produced or not for those sub-pixel(s), where M is the minimum number of pixels or sub-pixel dots that the laser printer can reliably and stably produce.

If a determination is made at step 120 that the current output halftone image sub-pixel dot would be isolated, then, at step 130, a determination is made to produce output halftone image sub-pixel dots for each of the next M output halftone image sub-pixel locations; otherwise, no action is taken at step 130. In general, $M \geq 1$. The value of M can depend upon the dot stability characteristics of the laser printer (or other image forming device). For example, if the minimum dot stability of the laser printer is two, then the value of M can be set to one (1), whereas if the minimum dot stability of the laser printer is four, then the value of M can be set to three (i.e., M=3).

At step 140, an output halftone image sub-pixel dot is produced if either a decision was made at step 110 to produce an output halftone image sub-pixel dot, or if a determination was made at step 130 to produce an output halftone image sub-pixel dot. Otherwise, no dot is produced for the current output halftone image sub-pixel location.

At step 150, the quantization error of the current output halftone image sub-pixel is calculated. In the illustrative example, since a dot was produced for the current output halftone image sub-pixel location, the quantization error of the current output halftone image sub-pixel is 255 (gray scale value of current output halftone image sub-pixel) minus 132.5 (error-modified gray scale value of current input image sub-pixel) equals 122.5.

At step 160, the quantization error of the current output halftone image sub-pixel calculated at step 150 is accumulated with those of neighboring output halftone image sub-pixels.

At step 170, the weighted quantization error value (wqev) of the neighboring output halftone image sub-pixels is determined, in the manner described previously. Steps 100–170 are repeated, for each input image sub-pixel to be halftoned, until the output halftone image is formed.

This method can be performed by any image forming device. An "image forming device" as used herein can include any device capable of forming or producing an image on print or visual media, including, but not limited to, digital printing presses, ink jet printers, daisy wheel printers, thermal printers, laser printers, facsimile machines, copiers, scanners, and multi-function peripheral devices. A "printer" as used herein includes any device capable of forming marks (e.g., dots composed of liquefied toner or ink) on print media (e.g., printer paper).

The method can be implemented in software, firmware, and/or hardware. For example, the method can be implemented in software (executable code) that is installed or instantiated on the processor of a host computer and/or the processor of the image forming device. Alternatively, the method can be implemented in a dedicated or specially-programmed logic device, such as an ASIC (Application Specific Integrated Circuit) or microcontroller.

Figure 2:
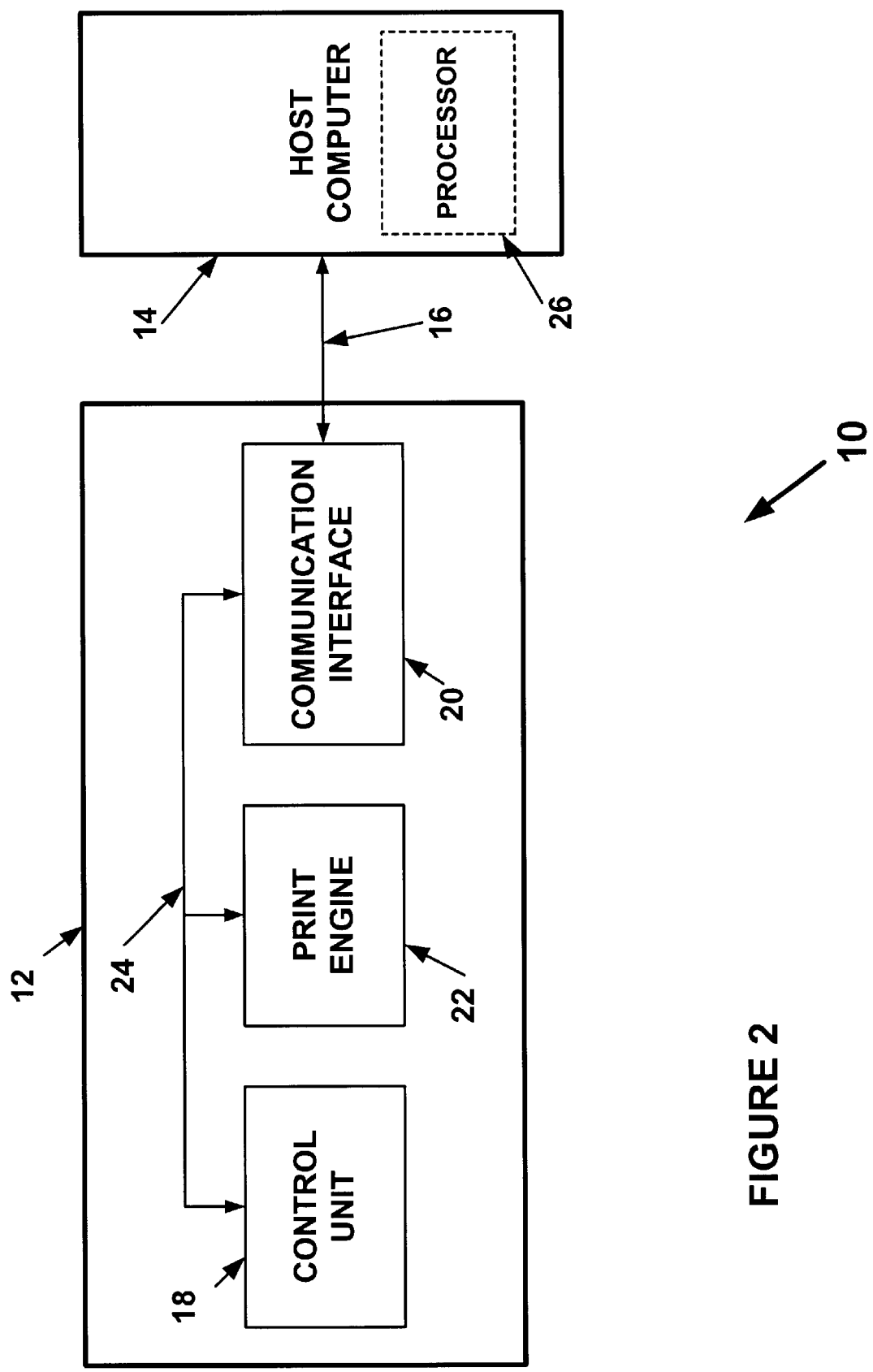
FIG. 2 is a flow chart illustrating a method for forming an image according to an embodiment of the present invention.

Reference is made to FIG. 2, which shows an exemplary printing system 10. The exemplary system 20 includes a laser printer 12 and a host computer 14 connected by a communication link 16. The laser printer 12 includes a control unit 18, a communication interface 20, and a print engine 22 interconnected via a bus 24. The control unit 18 includes a processor or other logic device programmed to control various functions of the laser printer 12. The communication interface 20 can suitably be adapted to receive source or input image data from a digital camera, memory card, memory stick, scanner, host computer, removable mass memory storage media, and/or any other source of image data.

The print engine 22 may include an electrophotography drum imaging system for printing an output image on printer paper. The exemplary laser printer 12 may have at least two imaging modes of operation, including a standard resolution mode (e.g., 600 dpi) and an enhanced resolution mode (e.g., 2,400 dpi).

The host computer 14 includes a processor 26. The processor 26 of the host computer 14 and/or the printer control unit 18 may perform the method of FIG. 1. For example, the method of FIG. 1 can be performed using software instantiated on the processor 26 of the host computer 22 and/or the processor of the printer control unit 18. Thus two exemplary image forming devices are shown in FIG. 2.

The hardware implementation of the method is not limited to the system shown in FIG. 2. The method can be implemented in other ways.

Although specific embodiments of the present invention have been described and illustrated, the present invention is not limited to the specific forms or arrangements of parts so described and illustrated. Instead, the present invention is construed according to the claims that follow.

What is claimed is:

1. A method for forming an output halftone image having a plurality of output halftone image pixels from an input image having a plurality of input image pixels, the method comprising processing the input image pixels with a halftoning process that incorporates a hard dot stability constraint, the process forcing a determination to produce a dot for each of M output halftone image pixels following an output halftone image pixel dot that would otherwise be isolated, where M≧1.

2. The method as set forth in claim 1, wherein the processing comprises:
   determining whether a dot should be produced for a current output halftone image pixel based upon a pixel value of the current input image pixel, unless that determination has already been made;
   if a determination is made that a dot should be produced for the current output halftone image pixel, then determining whether that dot would be an isolated dot, unless that determination has already been made; and
   if a determination is made that an isolated dot would be produced, then making a determination that a dot will be produced at the next M current output halftone image pixel locations.

3. The method as set forth in claim 1, wherein the halftoning process comprises an error diffusion halftoning process.

4. The method as set forth in claim 3, wherein the error diffusion halftoning process comprises:
   determining a quantization error of the current output image pixel;
   accumulating the quantization error of the current output image pixel with previously-determined quantization errors of past output image pixels;
   combining the quantization errors of N neighboring output image pixels to produce a combined quantization error, where N≧1;
   determining an error-modified gray scale value of the current input image pixel by combining an unmodified gray scale value of the current input image pixel with the combined quantization error of the N neighboring output image pixels;
   comparing the error-modified gray scale value of the current input image pixel to a prescribed gray scale threshold value; and
   determining whether to produce a dot for the current output halftone image pixel, the dot produced if the error-modified gray scale value of the current input image pixel exceeds the prescribed gray scale threshold value.

5. The method as set forth in claim 4, wherein the quantization errors of N neighboring output image pixels is combined by weighting the quantization errors of each of the N neighboring output image pixels to produce weighted quantization errors, and then combining the weighted quantization errors to produce the combined quantization error.

6. The method as set forth in claim 2, wherein the pixel value of the current input image is determined by modifying an original pixel value of the current input image pixel using an error diffusion technique.

7. The method as set forth in claim 2, wherein the input image pixels and the output halftone image pixels comprise sub-pixels.

8. The method as set forth in claim 2, further comprising producing a dot with an image forming device having a standard horizontal resolution mode of P dots per inch, and an enhanced horizontal resolution mode of P/M dots per inch, where M is ≧2, and P>M.

9. The method as set forth in claim 8, wherein:
   each pixel of the output halftone image formed by the image forming device in the enhanced horizontal resolution mode is subdivided into M sub-pixels; and,
   the output halftone image pixels correspond to sub-pixels of the enhanced horizontal resolution mode of the image forming device.

10. The method as set forth in claim 1, further comprising producing dots with a laser printer.

11. Software stored on a computer-readable storage medium for performing the method set forth in claim 1.

12. A device for performing the method set forth in claim 1.

13. A method for forming an output halftone image having a plurality of output halftone image pixels from an input image having a plurality of input image pixels, comprising:
   determining whether a dot should be produced for a current output halftone image pixel based upon a pixel value of the current input image pixel, unless that determination has already been made;
   if a determination is made that a dot should be produced for the current output halftone image pixel, then determining whether that dot would be an isolated dot, unless that determination has already been made;
   if a determination is made that an isolated dot would be produced, then making a determination that a dot will be produced at the next M current output halftone image pixel locations, where M is an integer ≧1; and
   producing a dot for the current output halftone image pixel if a determination was made that a dot should be produced for that pixel in any of the preceding steps, and otherwise, not producing a dot for the current output halftone image pixel.

14. The method as set forth in claim 13, wherein a halftoning algorithm having a hard dot stability constraint makes the determinations.

15. The method as set forth in claim 13, wherein an error diffusion halftoning algorithm makes the determinations.

16. Software stored on a computer-readable storage medium for performing the method as set forth in claim 13.

17. A device for performing the method as set forth in claim 13.

18. An image forming device for forming an output halftone image having a plurality of output halftone image pixels from an input image having a plurality of input image pixels, the device comprising a processor for processing the input image pixels in order to determine whether to produce a dot or not for each of the output halftone image pixels, the processor using a halftoning process that incorporates a hard dot stability constraint and that forces a determination to produce a dot for each of M output halftone image pixels following an output halftone image pixel dot which would otherwise be isolated, where $M \geq 1$.

19. The image forming device as set forth in claim 18, wherein the image forming device comprises a laser printer including the processor.

20. The image forming device as set forth in claim 19, wherein:

the laser printer has a standard horizontal resolution mode of P dots per inch, and an enhanced horizontal resolution mode of P/M dots per inch, where M is $\geq 2$, and P>M;

each pixel of the output halftone image formed in the enhanced horizontal resolution mode is subdivided into M sub-pixels; and the output halftone image pixels correspond to sub-pixels of the enhanced horizontal resolution mode of the laser printer.

21. The image forming device as set forth in claim 18, wherein the processor is programmed to:

determine whether a dot should be produced for a current output halftone image pixel based upon a pixel value of the current input image pixel, unless that determination has already been made;

if a determination is made that a dot should be produced for the current output halftone image pixel, then determine whether that dot would be an isolated dot, unless that determination has already been made;

if a determination is made that an isolated dot would be produced, then make a determination that a dot will be produced at the next M current output halftone image pixel locations; and produce a dot for the current output halftone image pixel if a determination was made that a dot should be produced for that pixel in any of the preceding steps, and otherwise, not producing a dot for the current output halftone image pixel.

22. The image forming device as set forth in claim 18, wherein the halftoning process used by the processor comprises an error diffusion halftoning process.

23. The image forming device as set forth in claim 22, wherein the error diffusion halftoning process includes:

determining a quantization error of the current output image pixel;

accumulating the quantization error of the current output image pixel with previously-determined quantization errors of past output image pixels;

combining the quantization errors of N neighboring output image pixels to produce a combined quantization error, where $N \geq 1$;

determining an error-modified gray scale value of the current input image pixel by combining an unmodified gray scale value of the current input image pixel with the combined quantization error of the N neighboring output image pixels;

comparing the error-modified gray scale value of the current input image pixel to a prescribed gray scale threshold value; and determining to produce a dot for the current output halftone image pixel if the error-modified gray scale value of the current input image pixel exceeds the prescribed gray scale threshold value, and otherwise determining to not produce a dot for the current output halftone image pixel.

24. The image forming device as set forth in claim 23, wherein the processor combines the quantization errors of N neighboring output image pixels by weighting the quantization errors of each of the N neighboring output image pixels to produce weighted quantization errors, and then combining the weighted quantization errors to produce the combined quantization error.

25. The image forming device as set forth in claim 23, wherein the input image pixels and the output halftone image pixels comprise sub-pixels.

26. An article for a processor, the article comprising memory encoded with a program for instructing the processor to form an output halftone image having a plurality of output halftone image pixels from an input image having a plurality of input image pixels by processing the input image pixels in order to determine whether to produce a dot for each of the output pixels, the processor using a halftoning process that incorporates a hard dot stability constraint that forces a determination to produce a dot for at least one output pixel following an output pixel dot that would otherwise be isolated.

27. The article as set forth in claim 26, wherein the halftoning process is an error diffusion halftoning process.

* * * * *